US010635559B2

(12) United States Patent
Markello et al.

(10) Patent No.: US 10,635,559 B2
(45) Date of Patent: Apr. 28, 2020

(54) MAINTAINING DATA INTEGRITY OVER MULTIPLE APPLICATIONS

(71) Applicant: INTERNATIONAL BUSINESS MACHINES CORPORATION, Armonk, NY (US)

(72) Inventors: Alexandra D. Markello, Fayetteville, NC (US); Dana L. Price, Surf City, NC (US); Heather L. Saunders, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 110 days.

(21) Appl. No.: 15/363,489

(22) Filed: Nov. 29, 2016

(65) Prior Publication Data
US 2018/0150338 A1 May 31, 2018

(51) Int. Cl.
*G06F 9/54* (2006.01)
*G06F 11/34* (2006.01)
*G06F 11/30* (2006.01)

(52) U.S. Cl.
CPC .......... *G06F 11/302* (2013.01); *G06F 11/30* (2013.01); *G06F 11/3409* (2013.01)

(58) Field of Classification Search
CPC ........ G06F 9/4443; G06F 9/543; G06F 9/541; G06F 9/4445
See application file for complete search history.

(56) References Cited

U.S. PATENT DOCUMENTS

| 5,706,509 A | 1/1998 | Man-Hak Tso |
| 6,920,452 B2 | 7/2005 | Dieberger |
(Continued)

FOREIGN PATENT DOCUMENTS

| WO | 2007038617 | 4/2007 |
| WO | 2010062759 | 6/2010 |
| WO | 2010071802 | 6/2010 |

OTHER PUBLICATIONS

Sivathanu et al.,"Ensuring Data Integrity in Storage: Techniques and Applications", Stony Brook University, First ACM Workshop on Storage Security and Survivability, Nov. 14, 2005, 22 pages.
(Continued)

*Primary Examiner* — Umut Onat
(74) *Attorney, Agent, or Firm* — William Hartwell; Andrew D. Wright; Roberts Mlotkowski Safran Cole & Calderon, P.C.

(57) ABSTRACT

Systems and methods for maintaining data integrity across multiple applications are disclosed. In one example, a computer-implemented method includes monitoring, by a computing device, user data across multiple computer applications to detect trackable data, the trackable data including a first data set associated with a first application and a second data set associated with a second application; tracking, by the computing device, the trackable data; determining, by the computing device, that the first data set is similar to the second data set; identifying, by the computing device, a discrepancy between the first data set and the second data set; and implementing, by the computing device, a change to the first data set based on the second data set to automatically maintain integrity of the first and second data sets across the respective first and second applications.

20 Claims, 3 Drawing Sheets

(56) References Cited

U.S. PATENT DOCUMENTS

| | | | |
|---|---|---|---|
| 7,065,746 B2* | 6/2006 | Szabo | G06F 9/541 |
| | | | 717/121 |
| 7,512,638 B2 | 3/2009 | Jhaveri et al. | |
| 8,452,631 B2 | 5/2013 | Doss et al. | |
| 9,830,325 B1* | 11/2017 | Joseph | G06Q 40/00 |
| 2005/0044187 A1 | 2/2005 | Jhaveri et al. | |
| 2009/0243921 A1 | 10/2009 | Gebben et al. | |
| 2012/0130945 A1 | 5/2012 | i Dalfo et al. | |
| 2012/0173608 A1* | 7/2012 | Bhogal | G06Q 10/109 |
| | | | 709/203 |
| 2012/0278885 A1* | 11/2012 | Hira | G06F 21/645 |
| | | | 726/22 |
| 2014/0201145 A1 | 7/2014 | Dorman et al. | |
| 2016/0092768 A1* | 3/2016 | Patil | G06F 8/61 |
| | | | 706/46 |
| 2018/0276235 A1* | 9/2018 | Rudge | H04L 67/30 |

OTHER PUBLICATIONS

Okun et al., "Atomic writes for data integrity and consistency in shared storage devices for clusters", Future Generation Computer Systems 20, 2004, 9 pages.

\* cited by examiner

MAINTAINING DATA INTEGRITY OVER MULTIPLE APPLICATIONS

BACKGROUND

The present invention relates generally to maintaining data integrity and, more particularly, to maintaining data integrity over multiple applications.

Often times, the same information resides in multiple places (e.g., documents, applications, files, messages, presentations, spreadsheets, calendars, etc.) on a user's computer and other devices (e.g., smartphone, tablet, laptop computer, etc.). When a change needs to be made to the information, it is cumbersome to remember and re-locate all the places the information has been used in order to update the information. As an example, if a user schedules a meeting via email with a customer at a particular time and location, and then the meeting is added to the user's work calendar, personal calendar, and communicated to another user over an instant messaging application to invite the other user to the meeting, the time and location of the meeting has now been repeated in four distinct places. In this example, the instant messaging application is utilized by the user to reschedule the time of the meeting with the customer, a telephone call is utilized to change the time of the meeting with the customer, and the user updates the user's work calendar to reflect the new meeting time. However, in this example, if the user forgets to update the meeting time in the user's personal calendar, this creates opportunity for confusion and mistakes (e.g., missing the meeting).

The propagation of the new meeting time may be even more complicated when the meeting information is recorded in a non-calendar type of application. For example, if the meeting is referenced in a presentation file, on a blog, on a wiki, etc., it may quickly become difficult to keep track of all of the places the information needs to be updated. Furthermore, typographical errors can compound the problem of propagating information through various applications and tools. For example, if the user accidently inputs the wrong meeting time into one of the user's calendars, the opportunity for errors (e.g., missed meetings) increases.

There are multiple server-centric data integrity solutions that synchronize calendar entries across different devices and allow for users to share calendar entries across different sets of users and devices. However, these types of solutions do not solve the problem of updating information entered outside of server-provided applications, such as information in blog entries and chat sessions.

There are also data integrity solutions that recognize that certain types of information have been received or entered (e.g., dates, times, addresses), and automatically propagate or facilitate the propagation of the information into calendar entries, contact lists, or the like. However, these types of solutions work for single devices, and do not attempt to synchronize or coordinate different entries of the information. Instead, these solutions facilitate the transfer of information from one entry (e.g., email) into a store (i.e., calendar).

SUMMARY

In an aspect of the invention, a computer-implemented method for maintaining data integrity across multiple applications includes: monitoring, by a computing device, user data across multiple computer applications to detect trackable data, the trackable data including a first data set associated with a first application and a second data set associated with a second application; tracking, by the computing device, the trackable data; determining, by the computing device, that the first data set is similar to the second data set; identifying, by the computing device, a discrepancy between the first data set and the second data set; and implementing, by the computing device, a change to the first data set based on the second data set to automatically maintain integrity of the first and second data sets across the respective first and second applications.

In another aspect of the invention, there is a computer program product for maintaining data integrity across multiple applications. The computer program product comprises a computer readable storage medium having program instructions embodied therewith. The program instructions are executable by a computing device to cause the computing device to: monitor user data across multiple applications to detect trackable data, the trackable data including a first data set associated with a first application and a second data set associated with a second application; track the trackable data; determine that the first data set is similar to the second data set; identify a discrepancy between the first data set and the second data set; and provide a notification of the discrepancy to a user, the notification including data integrity options to be performed by the computing device to maintain data integrity across the first and second applications.

In another aspect of the invention, there is a system for maintaining data integrity across multiple applications. The system includes a CPU, a computer readable memory and a computer readable storage medium associated with a computing device. The system also includes: program instructions to monitor user data across multiple applications and multiple devices to detect trackable data; program instructions to track the trackable data, the trackable data including newly identified trackable data, first stored trackable data and second stored trackable data, wherein the first and second stored trackable data are the same, and the newly identified trackable data, the first stored trackable data and the second stored trackable data are correlated; program instructions to identify a discrepancy between the newly identified trackable data and the first and second stored trackable data; and program instructions to provide a notification of the discrepancy to a user, the notification including data integrity options to be performed by the computing device; wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
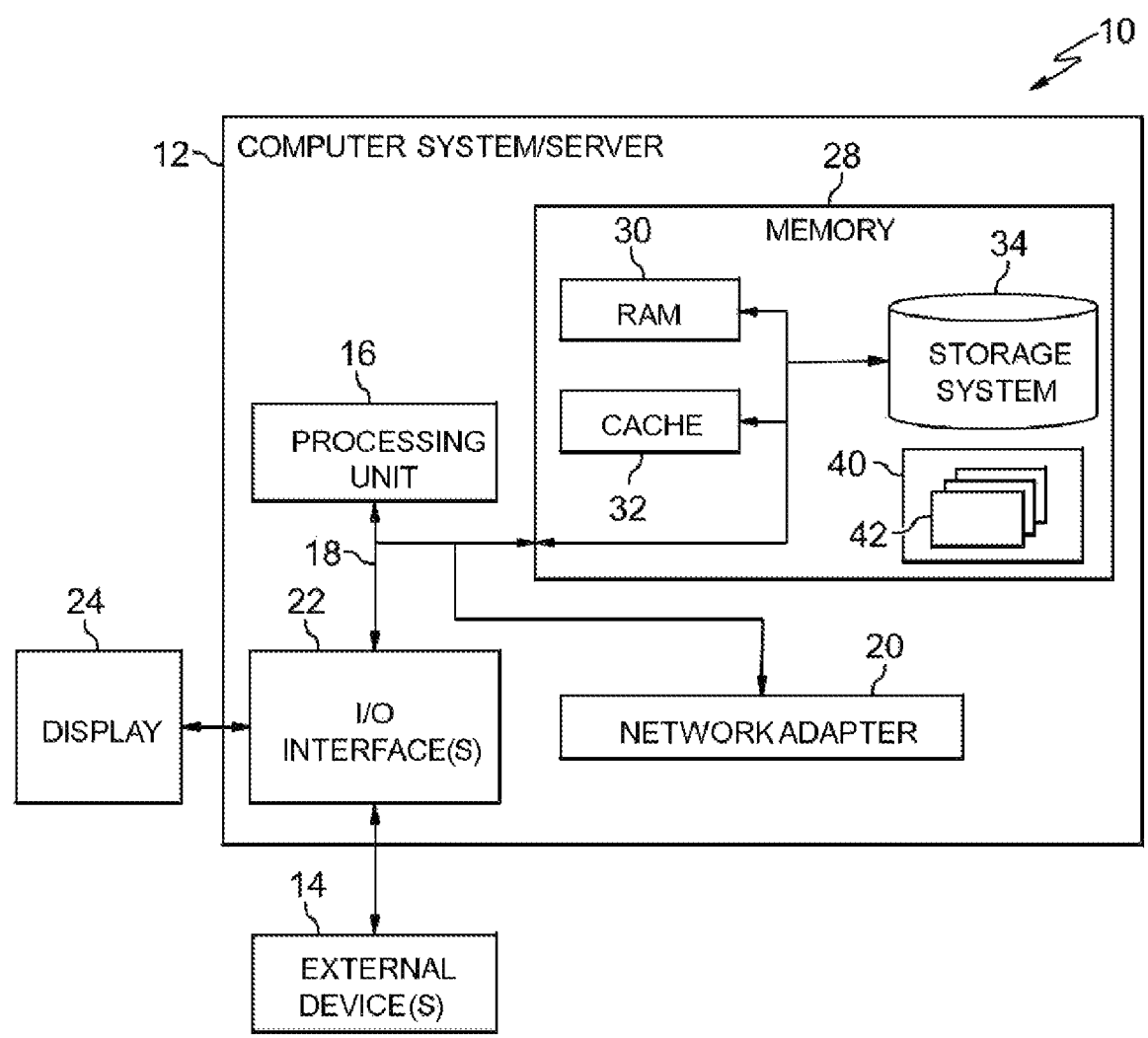
FIG. 1 depicts a computing infrastructure according to an embodiment of the present invention.

The present invention relates generally to maintaining data integrity and, more particularly, to maintaining data integrity over multiple computer applications. In embodiments, a system and method are directed to maintaining data integrity across multiple applications, locations (e.g., locations within the same document or application) and/or platforms so that different instances of the same data across multiple applications/locations/platforms are kept consistent. In aspects, the system includes a computer system that identifies types of data that a user wishes to monitor (e.g., contact information, calendar entries, event names, product names, etc.), and monitors the user's activity across multiple applications/locations/platforms to detect data entries of the identified types. In aspects, the system determines whether any of the detected entries within a given type are likely to be different instances of the same data (e.g., two different copies of the same persons' address). If a discrepancy is found between two or more entries that are likely to be different instances of the same data, the system alerts the user to the discrepancy, providing the user with the opportunity to correct the discrepancy. In alternate embodiments, the system is configured to monitor and compare data from multiple users, so that data from a group of users (e.g., team members or family members) can be kept consistent.

Advantageously, embodiments of the present invention enable users to maintain data integrity across multiple applications, locations and/or platforms without requiring each application to provide synchronization functionality. Specifically, the present invention does not require programming code to be injected into each participating application. Moreover, the present system may be utilized with applications using data in different formats, and from different providers, without requiring the providers/applications to adhere to a data format standard. The present invention provides for improvements to the function of computing devices by enabling automatic propagation of data changes across multiple applications, locations and/or platforms based on user preferences, without users having to keep track of the location of all of the times the data has been mentioned and/or copied. In embodiments, the system enables a user to decide whether a difference in data should be propagated, or that the difference in data is a mistake that needs correcting in a single location.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as SMALLTALK™ (an object-oriented, dynamically typed, reflective programming language), C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components may be used in conjunction with computer system 12. Examples, include, but are not limited to: microcode, device drivers, redundant processing units, external disk drive arrays, RAID systems, tape drives, and data archival storage systems, etc.

Figure 2:
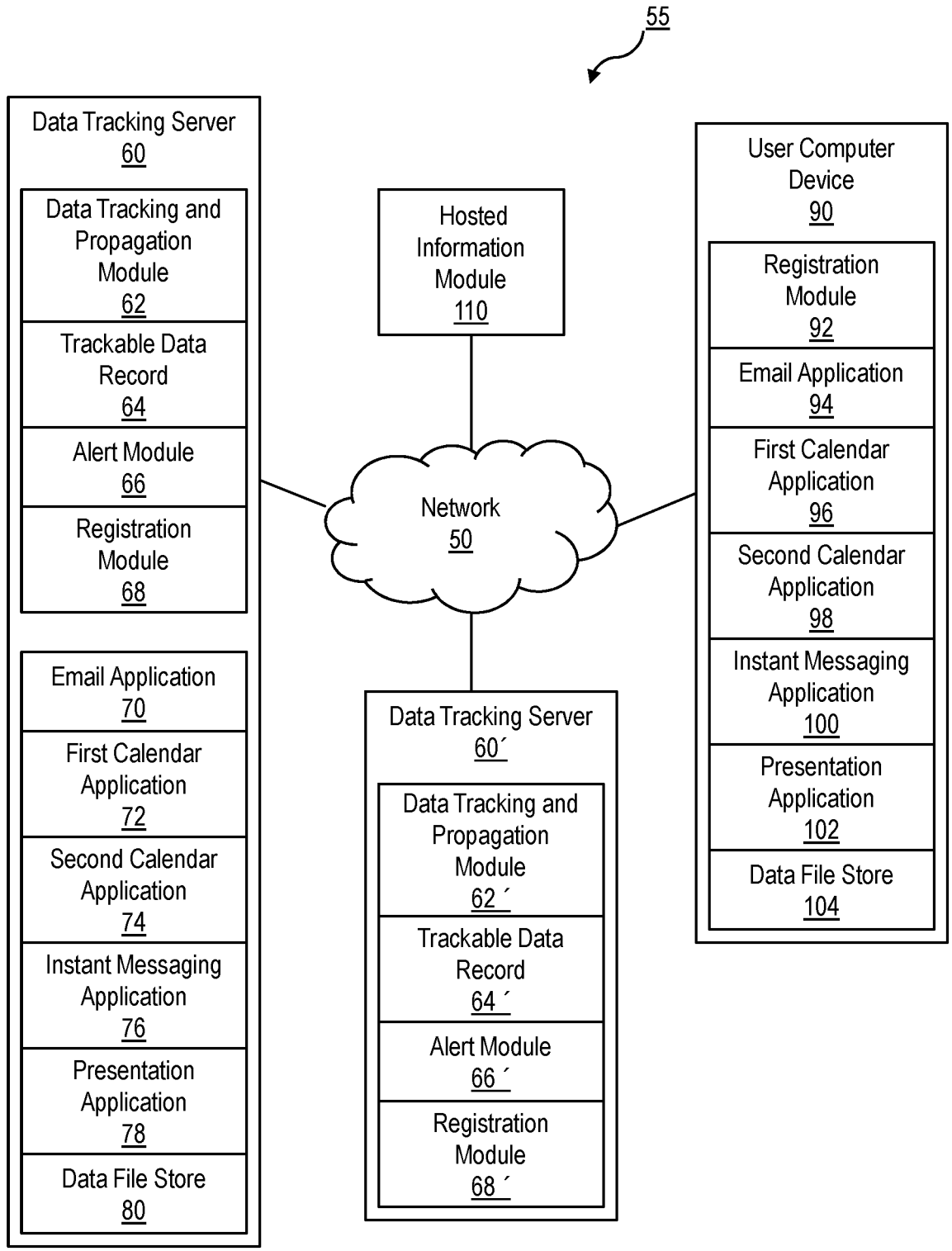
FIG. 2 shows an exemplary environment in accordance with aspects of the invention.

FIG. 2 shows an exemplary data integrity system 55 environment in accordance with aspects of the invention. The environment includes a data tracking server 60 (e.g., a web server) connected to a network 50. The data tracking server 60 may comprise a computer system 12 of FIG. 1, and may be connected to the network 50 via the network adapter 20 of FIG. 1. In embodiments, the data tracking server 60 is a general purpose computing device providing data integrity services directly to a user, such as a desktop computer, laptop computer, tablet computer, smartphone, etc. In embodiments, the data tracking server 60 includes a data tracking and propagation module 62, a trackable data record store 64, an alert module 66 and a registration module 68. The data tracking server 60 may also have a variety of applications, data stores, and tools associated with a general purpose computing device. By way of example, the data tracking server 60 may include an email application 70, a first calendar application 72, a second calendar application 74, an instant messaging application 76, a presentation application 78 and a data file store 80.

In embodiments, a data tracking server 60' is configured as a special purpose computing device that is part of a service provider's infrastructure to provide data integrity services to multiple users and user devices. For example, the data tracking server 60' may be configured to provide data integrity services to one or more user computer devices 90 through the network 50. In embodiments, the data tracking server 60' includes a data tracking and propagation module 62', a trackable data record 64', an alert module 66' and a registration module 68'.

The network 50 may be any suitable communication network or combination of networks, such as a local area network (LAN), a general wide area network (WAN), and/or a public network (e.g., the Internet). The user computer device 90 may be a general purpose computing device, such as a desktop computer, laptop computer, tablet computer, smartphone, etc. In embodiments, the user computer device 90 includes a registration module 92 that enables the user computer device 90 to communicate registration information with a data tracking server (e.g., 60, 60'). The user computer device 90 may include a variety of applications, data stores, and tools associated with a general purpose computing device. By way of example, the user computer device 90 may include an email application 94, a first calendar application 96, a second calendar application 98, an instant messaging application 100, a presentation application 102 and a data file store 104.

Still referring to FIG. 2, the data tracking and propagation module 62 of the data tracking server 60 is configured to perform one or more of the functions described herein. The data tracking and propagation module 62 may include one or more program modules (e.g., program module 42 of FIG. 1) executed by the data tracking server 60. In embodiments, the data tracking and propagation module 62 is configured to determine correlations between trackable data sets (determine that the data sets are the same or similar) and identify discrepancies between multiple instances of correlated trackable data sets. As used herein, the term trackable data refers to data that complies with a predetermined set of rules defining a type of information. By way of example, trackable data may include scheduling data (e.g., date, time, location) and contact data (e.g., addresses and telephone numbers). In embodiments, the trackable data record 64 maintains a record of a user's trackable data.

The alert module 66 may include one or more program modules (e.g., program module 42 of FIG. 1) executed by the data tracking server 60. In embodiments, the alert module 66 is configured to provide a user with one or more alerts or data integrity options for maintaining the integrity of trackable data between applications, locations and/or platforms. As used herein, the term data integrity option refers to an option to address the discrepancy in similar trackable data sets.

The registration module 68 may include one or more program modules (e.g., program module 42 of FIG. 1) executed by the data tracking server 60. In embodiments, the registration module 68 is configured to identify and/or register one or more applications and devices with the data tracking and propagation module 62. In aspects the registration module 68 enables a user to select which applications and/or devices will participate in the actions of the data tracking and propagation module 62. In embodiments, the registration module 68 may include registration information for a third party information source, such as a hosted information module 110. By way of example, the hosted information module 110 can be a blog site.

Still referring to FIG. 2, the data tracking and propagation module 62' of the data tracking server 60' is configured to perform one or more of the functions described herein for multiple users. The data tracking and propagation module 62' may include one or more program modules (e.g., program module 42 of FIG. 1) executed by the data tracking server 60'. In embodiments, the data tracking and propagation module 62' is configured to identify discrepancies between multiple instances of the same or similar trackable data sets for one or more user devices 90. By way of example, trackable data may include scheduling data (e.g., date, time, location) and contact data (e.g., addresses and telephone numbers) for members of an organization. In embodiments, the trackable data record store 64' maintains a record of multiple users' trackable data.

The alert module 66' may include one or more program modules (e.g., program module 42 of FIG. 1) executed by the data tracking server 60'. In embodiments, the alert module 66' is configured to provide multiple users with one or more alerts or data integrity options for maintaining the integrity of trackable data between applications, locations and/or platforms. The alert module 66' may be configured to send notifications to directly to one or more users, or to a data manager or administrator.

The registration module 68' may include one or more program modules (e.g., program module 42 of FIG. 1) executed by the data tracking server 60'. In embodiments, the registration module 68' is configured to store user identification information. In embodiments, the registration module 68' stores identification and/or registration information for one or more applications and devices of multiple users. In aspects, the data tracking and propagation module 62' maintains data integrity for those devices and applications identified in the registration module 68'. For example, the registration module 68' may identify the applications and/or devices for each member of an organization. In embodiments, the registration module 68' communicates with and receives registration information from the registration module 92 of one or more user computer devices 90. In embodiments, the registration module 68' includes registration information for a third party information source, such as a hosted information module 110.

Figure 3:
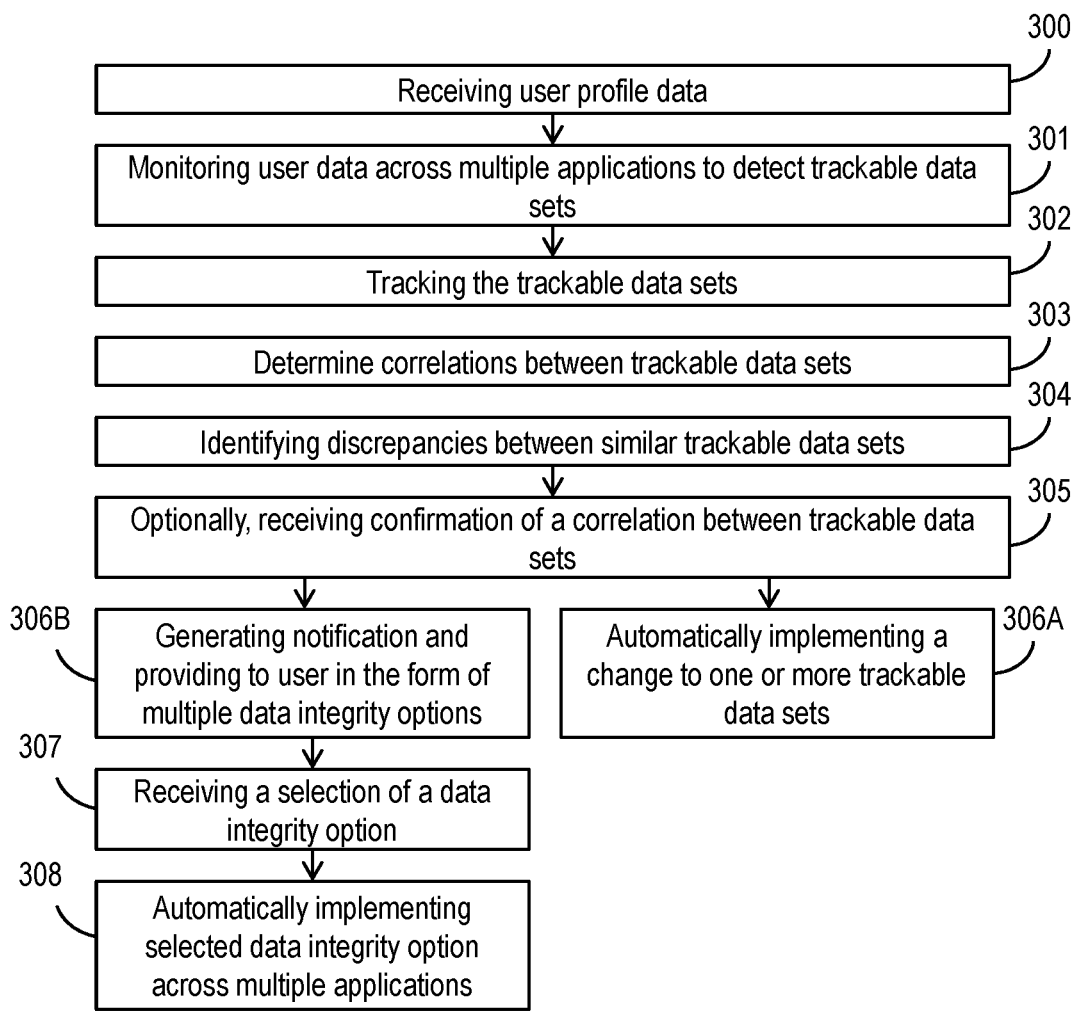
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2. It is noted that either data tracking server 60 (shown as incorporated into a user device) or data tracking server 60' (shown as a network server for communication with multiple user computer devices 90) could be utilized in accordance with the steps of FIG. 3.

At step 300, user profile data is received by the data integrity system 55. In embodiments, user profile data is received by the registration module 68 of the data tracking server 60. In aspects, the user profile data includes user identification information and user system preferences. In embodiments, the user profile data includes registration information regarding user devices and/or applications which are to be monitored by the data tracking and propagation module 62. As used herein, the term application refers to a computer program designed to perform a group of coordinated functions, tasks or activities. For example, the data tracking server 60 may present a registration window (not shown) to a user, through which the user can identify the applications and/or devices that the user wishes to participate in the data integrity system 55. Such applications and/or devices may include, for example, the email application 70, the first calendar application 72, the second calendar application 74, the instant messaging application 76, the presentation application 78 (e.g., slide presentation application), and a hosted information module 110 (hosting the user's blog, or the like).

In other embodiments, user profile data for multiple users is received by the registration module 68' of the data tracking server 60'. In embodiments, the data tracking server 60' communicates with the registration module 92 of the user computing device 90 to obtain registration information. In aspects, the user profile data may include user identification information, user system preferences, and registration information regarding user devices, applications or individual locations (e.g., documents) which are to be monitored by the data tracking and propagation module 62'. For example, the data tracking server 60' may cause a registration window (not shown) to be presented to a user through the user computer device 90, through which the user can identify the applications, locations and/or devices that the user wishes to participate in the data integrity system 55. Such applications, locations, and/or devices may include, for example, the email application 94, the first calendar application 96, the second calendar application 98, the instant messaging application 100, the presentation application 102 (e.g., slide presentation application), and a hosted information module 110 (hosting the user's blog, or the like).

In embodiments, the user profile data includes data regarding a user's preferences with respect to trackable data. By way of example, a data tracking server (e.g., 60 or 60') may present options to a user during a registration process, enabling a user to select types of data to be monitored by the data tracking and propagation module (e.g. 62 or 62'). Examples of types of data that may be selected for monitoring include contact data (names, addresses, telephone numbers, birthdays, etc.) and scheduling data (holidays, appointment dates, appointment times, appointment location, etc.). In embodiments, the data tracking and propagation module (e.g., 62 or 62') has predetermined categories of trackable data, and also includes user defined categories. In embodiments, the registration module (e.g., 68 or 68') enables a user to set user preferences to limit the types of information that are to be monitored (e.g., phone numbers, addresses, times/dates, etc.), indicate which applications to include in the monitoring (e.g., mail, certain web sites, etc.), and indicate which devices would be permitted to participate.

At step 301, the data integrity system 55 monitors user data to identify trackable data sets. In embodiments, the data tracking and propagation module 62 of data tracking server 60 monitors data received by or entered into the data tracking server 60 to determine if trackable data has been received and/or entered. In embodiments, the data tracking server 60 also monitors data received by or entered into the hosted information module 110. The trackable data may be a predetermined type of data (e.g., contact and scheduling data) recognized by the data tracking and propagation module 62, and/or may be user defined types of data received during step 300. Similarly, in another embodiment, the data tracking and propagation module 62' of the data tracking server 60' monitors data received by one or more user computer devices 90 or entered into the one or more user computer devices 90 to determine if trackable data has been received and/or entered. The trackable data may be a predetermined type of data (e.g., contact and scheduling data) recognized by the data tracking and propagation module 62', and/or may be user defined types of data received during step 300.

Various data tracking methods may be utilized in accordance with embodiments of the present invention. By way of example, data collection techniques such as keystroke logging, reading incoming messages and/or emails, retaining a record of copy/paste actions, image processing to identify data in screenshots, pattern matching, change logs, etc., may be utilized by a data tracking and propagation module (e.g., 62 or 62') of the present invention.

At step 302, a data tracking and propagation module (62 or 62') tracks the trackable data identified at step 301. In embodiments, tracking the trackable data includes referencing or storing the trackable data in a trackable data record (64 or 64'). Various data tracking techniques may be utilized in accordance with embodiments of the present invention. By way of example, a data tracking and propagation module (62 or 62') may tag data with metadata identifying the data as belonging to certain groups of data, such as contact information, scheduling entries, event names, product names, dates, times, etc. Data may also be tracked when words or phrases are copied or pasted between different participating programs (e.g., from the first calendar application 72 into the instant messaging application 76, from the second calendar application 74 into a blog entry through hosted information module 110, etc.). In aspects, data that is not copied or pasted but is instead typed, but has the same characteristics as another entry with trackable data (e.g., location and time entry), can be correlated as being the same data. In embodiments, trackable data is stored with references to all locations where that data is used. For example, contact information may be initially stored from a received email in the data file store 80, then copied and pasted into an address book, as well as in another sent email. In this case, the trackable data record 64 references the location of the trackable data as being located in the email in the data file store 80, the address book, and the other sent email. In embodiments, a trackable data record (64 or 64') is maintained for a single user across multiple devices (e.g., multiple user computer devices 90), including laptop computers, smartphones, etc., by setting up the user registration profile at step 300 to include the multiple devices in the data integrity system 55. In alternate embodiments, the trackable data record 64' is maintained with family-centric or organization/team-centric records in a cloud environment.

Steps 301 and 302 may be repeated any number of times for one or more trackable data sets. For example, the same trackable data set may be recognized in accordance with step 301, and referenced or stored in the trackable data record (64 or 64') as being located in a variety of locations (e.g., email application 70, first calendar application 72, etc.).

At step 303, correlations between trackable data sets are determined. As used herein, the term "correlated trackable data sets" refers to sets of trackable data that are the same or similar. By similar, it is meant that the trackable data sets are not the same, but have enough common data to link the trackable data sets. In embodiments, the data tracking and propagation module (62 or 62') determines correlations between trackable data sets in the trackable data record 64. In embodiments, the data tracking and propagation module (62 or 62') determines whether any of the detected trackable data entries within a given type (e.g., scheduling data) are likely to be a different instance of the same data (for example, two slightly different copies of the same person's address). In embodiments, the data tracking and propagation module (62 or 62') recognizes similarities in trackable data and, if the similarities meet a predefined threshold value, the data tracking and propagation module (62 or 62') recognizes the trackable data sets as correlated. By way of example, if one set of address data is 95% the same as a second set of address data, then the data tracking and propagation module (62 or 62') will recognize the that first and second address data sets are correlated. It should be understood that step 303 can occur concurrently with steps 301 and 302. For example, if a user opens the first calendar application 72 to update a calendar entry, the data tracking and propagation module 62 will recognize that a change is being made to trackable data, and will recognize that the change is creating a discrepancy with respect to the other correlated trackable data sets (e.g., calendar entry previously copied to email).

At step 304, discrepancies in correlated trackable data sets are identified by the data tracking and propagation module (62 or 62'). Optionally, at step 305, a data tracking and propagation module (62 or 62') prompts a user when it identifies a discrepancy in correlated trackable data sets at step 303 to confirm or deny the correlation of the trackable data sets. By way of example, the data tracking and propagation module 62' can cause a confirmation screen (not shown) to be presented to a user through a user computer device 90, wherein the confirmation screen identifies the trackable data sets and asks for confirmation that the data sets should be correlated.

In embodiments, at step 306A, the data tracking and propagation module (62 or 62') implements a change to one or more correlated trackable data sets based on a set of stored rules. By way of example, the data tracking and propagation module 62 automatically updates all previously referenced or stored trackable data sets correlated to a new trackable data set when the new trackable data set is a revision to a calendar event in the first calendar application 72, based on a set of rules in the alert module 66. With this example, a user only need update events in the first calendar application 72 in order to have the changes propagated throughout all correlated trackable data sets.

In embodiments, at step 306B, the alert module (66 or 66') generates a notification which presents data integrity options to a user. In embodiments, the notification includes multiple options regarding how to treat the discrepancy in correlated trackable data recognized at step 303. In aspects, the notification provides the following options to a user: (1) update a newly identified trackable data set to match one or more previously referenced and/or stored trackable data sets with which it is correlated; (2) change one or more previously referenced and/or stored trackable data sets to match a newly identified trackable data set with which it is correlated; (3) create a new trackable data set record (i.e., a newly identified trackable data set) that does not correlate to one or more previously referenced and/or stored trackable data sets; (4) no action occurs and the user can make modifications manually, if desired. In embodiments, the alert module 66' of the data tracking server 60' presents the notification to the user through an interface of the user computer device 90. In embodiments, the alert module 66 of the data tracking server 60 presents the notification to the user through an interface of the data tracking server 60. The notification of step 306B may be generated based on a set of rules stored in the alert module (66 or 66').

In embodiments, step 306B is implemented after the data tracking and propagation module (62 or 62') has determined that there are no stored rules in the alert module (66 or 66') that are relevant to the trackable data at issue. For example, the data tracking and propagation module (62 or 62') may recognize that there is no rule associated with updates to address data, and therefore no automatic change to the address data (trackable data) would occur (i.e., step 306A would not occur) and the data tracking and propagation module (62 or 62') would implement step 306B.

At step 307, the data tracking server (60 or 60') receives a selection of a data integrity option from the notification of step 306B. In embodiments, the data tracking server 60' receives the selection of the data integrity option from the interface of the user computer device 90. In embodiments, the data tracking server 60 receives the selection of the data integrity option from the interface of the data tracking server 60.

At step 308, the data tracking server (60 or 60') implements the user selected option received at step 307. In embodiments, the data tracking server 60' causes the option to be implemented by the user computer device 90. In embodiments, the user selected option is implemented by the data tracking server 60. In embodiments, the user selected option is implemented by the data tracking server 60 (as a user computer device), and effects data in the data tracking server 60 and another computer device of the user (e.g., user computer device 90). By way of example, the data tracking server 60 may be a user's work computer and may communicate with the user's personal computer 90 through the network 50. Scheduling information in the user's work email application 70, as well as correlated scheduling information on the user's personal email application 94, may both be updated at step 308 based on the user's selected option received at step 307.

An exemplary scenario will now be discussed with reference to FIGS. 2 and 3. In the exemplary scenario, a user of data tracking server 60 prepares a slide presentation in March using the presentation application 78. The slide presentation includes scheduling information for an event in April. The data tracking and propagation module 62 recognizes that the April scheduling data is trackable data in accordance with step 301 of FIG. 3, and references or stores the April scheduling data and related data (e.g., the event name) in the trackable data record 64 in accordance with step 302 of FIG. 3. The user receives an email through the data tracking server indicating that the April event has been rescheduled for May. The data tracking and propagation module 62 determines that the email includes May scheduling data related to the event (trackable data) in accordance with step 301 of FIG. 3), and also determines that the May scheduling data is similar enough to the previously referenced/stored April scheduling data to meet a sameness threshold, but is not the same (and therefore includes discrepancies) in accordance with steps 303 and 304 of FIG. 3. The alert module 66 then sends a notification to the user through a user interface (not shown) of the data tracking server 60, presenting the April scheduling data from the presentation, the May scheduling data from the email, and user selectable data integrity options in accordance with step 306B of FIG. 3. The user sees that the meeting has been rescheduled, and chooses to update all correlated trackable data in the system. The data tracking and propagation module 62 receives the selected user option in accordance with step 307 of FIG. 3, and automatically propagates the change in scheduling information to all instances of correlated trackable data, including the scheduling information located in slide presentation, in accordance with step 308 of FIG. 3.

Another exemplary scenario will now be discussed with reference to FIGS. 2 and 3. In this second scenario, a user schedules a meeting with a customer at 4 pm in building 500 through the email application 94 of a user computer device 90. The user computer device 90 is in communication with a data tracking server 60'. The data tracking and propagating module 62' of the data tracking server 60' recognizes the scheduling information as trackable data in accordance with step 301 of FIG. 3, and records the time, date and location of the meeting and the application where it resides in the trackable data record 64' in accordance with step 302 of FIG. 3. The user then adds the meeting information to the user's work calendar through the first calendar application 96. The data tracking and propagating module 62' detects the commonality, records the calendar application entry, and connects the first and second scheduling data sets together in the trackable data record 64' in accordance with step 302 of FIG. 3.

Next, the user adds the meeting information to the user's personal calendar through the second calendar application 98. The data tracking and propagating module 62' detects the commonality, records the second calendar application entry, and connects the first, second and third scheduling data sets together in the trackable data record 64' in accordance with step 302 of FIG. 3. The user then communicates with to the user's boss (via the instant messaging application 100) that the user would like his/her boss to attend the meeting as well. The data tracking and propagating module 62' detects the commonality, records the instant messaging application entry, and connects the first, second, third and fourth scheduling data sets together in the trackable data record 64' in accordance with step 302 of FIG. 3.

Next, the user prepares for a meeting by copying and pasting the scheduling information into a slide document using the presentation application 102. The data tracking and propagating module 62' detects the commonality, records the presentation application entry, and connects the first, second, third, fourth and fifth scheduling data sets together in the trackable data record 64' in accordance with steps 302 and 303 of FIG. 3. In this scenario, the data tracking and propagation module 62' has recorded five instances of the same or similar scheduling data in the trackable data record 64'. Next, the user communicates via the instant messaging application 100 with the user's boss to provide new scheduling information to reschedule the meeting. The data tracking and propagation module 62' recognizes the new scheduling information as trackable data in accordance with step 301 of FIG. 3, and identifies that the new scheduling information is correlated with (meets a threshold sameness value) the initial scheduling information, but includes discrepancies in accordance with step 304 of FIG. 3. The data tracking server 60' either automatically updates all instances of correlated scheduling information, or presents a notification to the user to prompt the user to: (1) contact the customer, (2) update the user's work calendar through the first calendar application 96, (3) update the user's personal calendar through the second calendar application 98, and/or (4) update the user's slide presentation through the presentation application 102.

In addition to tracking and updating the scheduling information of the user, the data tracking and propagation module 62' may also recognize that other users (e.g., the user's assistant) have correlated data on their own user computer devices, and may also track and update the correlated data on the other user computer devices. For example, if the user chooses to update all instances of the scheduling information to be consistent with the new scheduling information, the data tracking and propagation module 62' may update correlated scheduling information in a calendar application of the user's assistant (e.g., a first calendar application 96 of a user computer device 90 of the boss), to maintain the integrity of the scheduling data across multiple user devices and applications.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses multiple applications, such as calendar, instant message, and presentation applications. In return, the service provider can receive payment from the customer(s) under a subscription and/or fee agreement and/or the service provider can receive payment from the sale of advertising content to one or more third parties.

In still another embodiment, the invention provides a computer-implemented method for maintaining data integrity. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for maintaining data integrity across multiple applications, comprising:
    accessing, by a computing device, user profile data of a user including information regarding: the user's selection of multiple computer applications distributed across a network that are monitored to maintain data integrity, user-selected data types that are monitored, and user-selected devices permitted to participate in the monitoring;
    monitoring, by the computing device, trackable user-input data of the multiple computer applications distributed across the network based on the user profile data, wherein the monitoring detects an entry of a first data set of the trackable user-input data in a first application, the trackable user-input data including the first data set and a second data set entered in a second application;
    determining, by the computing device, that the first data set in the first application is similar to the second data set in the second application when similarities of the first data set and the second data set meet a predefined threshold value;
    identifying, by the computing device, a discrepancy between the first data set in the first application and the second data set in the second application; and
    implementing, by the computing device, a change to the second data set in the second application based on the first data set in the first application, wherein the implementing automatically maintains integrity of the first and second data sets across the respective first application and the second application,
    wherein the user input data comprises text-based data input by the user.

2. The method of claim 1, further comprising tagging, by the computing device, the trackable user-input data with metadata identifying the trackable user-input data as belonging to at least one group of predetermined data types.

3. The method of claim 1, further comprising receiving, by the computing device, trackable user-input data preferences identifying the user-selected data types, wherein the data types are selected from the group consisting of: user contact data and user scheduling data.

4. The method of claim 1, further comprising:
    providing, by the computing device, a notification to a user of the discrepancy, the notification including data integrity options; and
    receiving, by the computing device, a selection of one of the data integrity options;
    wherein implementing the change to the first data set is based on the selection.

5. The method of claim 1, further comprising determining, by the computing device, that the discrepancy between the first data set and the second data set meets one or more rules, wherein implementing the change to the first data set is based on the one or more rules.

6. The method of claim 1, further comprising:
    sending, by the computing device, a request for confirmation to the user that the first data set and the second data set are the same or similar; and
    receiving, by the computing device, confirmation from the user that the first data set and the second data set are the same or similar.

7. The method of claim 1, wherein the trackable user-input data includes at least one selected from the group consisting of: calendar entries, contact data, telephone numbers, addresses, times, dates, event names, and product names.

8. A computer program product for maintaining data integrity across multiple applications, the computer program product comprising a computer readable storage medium having program instructions embodied therewith, the program instructions executable by a computing device to cause the computing device to:
    retrieve a first data set and a second data set, wherein the computing device retrieves the second data set from a second computing device via a network connection;
    receive user-selected preferences from a user identifying one or more of the multiple applications monitored, data types monitored, and devices permitted to participate in the monitoring;
    monitor user data across multiple applications, wherein the monitoring detects trackable user-input data, the trackable user-input data including the first data set entered in a first application and the second data set entered in a second application, wherein the monitoring is based on the user-selected preferences and the user data is text-based data input by the user;
    determine that the first data set is similar to the second data set when similarities between the first data set and the second data set meet a predefined threshold value;
    identify a discrepancy between the first data set and the second data set;
    provide a notification of the discrepancy to the user, the notification including data integrity options to be performed by the computing device to maintain data integrity across the first application and the second application; and
    store the trackable user-input data with references to multiple locations where the trackable user-input data is used.

9. The computer program product of claim 8, wherein the locations include email in a data file store and an address book.

10. The computer program product of claim 8, wherein the program instructions further cause the computing device to:
    receive a selection of one of the data integrity options; and
    automatically implement the selected one of the data integrity options, wherein the options comprise at least two of the group consisting of: update the first data set to match the second data set; change the second data set to match the first data set; create a new trackable data set record that does not correlate to the first data set or the second data set; and take no action.

11. The computer program product of claim 10, wherein automatically implementing the selected one of the data integrity options comprises effecting a change to the second data set based on the first data set.

12. The computer program product of claim 8, wherein the program instructions further cause the computing device to:
    send a request for confirmation of a correlation between the first data set and the second data set to the user; and
    receive confirmation of the correlation from the user.

13. The computer program product of claim 8, wherein the trackable user-input data includes at least one selected from the group consisting of: calendar entries, contact data, telephone numbers, addresses, times, dates, event names, and product names.

14. A system for maintaining data integrity across multiple applications, comprising:
    a CPU, a computer readable memory and a computer readable storage medium associated with a computing device;

program instructions to present tracking preference options to a user to enable the user to select: one or more applications to that are monitored; data types monitored, and devices permitted to participate in monitoring;

program instructions to receive a selection of the tracking preference options as user profile data;

program instructions to monitor user-input data across multiple applications of the user and multiple devices of the user distributed across a network, wherein the monitoring detects trackable user-input data, wherein the monitoring is based on the tracking preference options of user profile data, wherein the multiple applications include an email application of the user and a calendar application of the user;

program instructions to track entries of the trackable user-input data in the multiple applications, the trackable user-input data including newly identified trackable user-input data, first stored trackable user-input data and second stored trackable user-input data, wherein the first and second stored trackable user-input data are the same, and the newly identified trackable user-input data, the first stored trackable user-input data and the second stored trackable user-input data are correlated;

program instructions to identify a discrepancy between the newly identified trackable user-input data and the first and second stored trackable user-input data;

program instructions to provide a notification of the discrepancy to a user, the notification including data integrity options to be performed by the computing device; and program instructions to store the trackable user-input data with references to multiple locations where the trackable user-input data is used;

wherein the program instructions are stored on the computer readable storage medium for execution by the CPU via the computer readable memory.

15. The system of claim 14, further comprising:
program instructions to receive a selection of one of the data integrity options; and
program instructions to automatically implement the selected one of the data integrity options.

16. The system of claim 15, wherein the data integrity options include updating the newly identified trackable user-input data based on the first and second stored trackable user-input data, updating the first and second stored trackable user-input data based on the newly identified trackable user-input data, and designating the newly identified trackable user-input data as a new record which is not correlated with the first and second stored trackable user-input data.

17. The system of claim 14, further comprising:
program instructions to send a request for confirmation of a correlation between first stored data set and the second stored data set to the user; and
program instructions to receive confirmation of the correlation from the user.

18. The system of claim 14, wherein the newly identified trackable user-input data and first and second stored trackable user-input data include at least one selected from the group consisting of: calendar entries, contact data, telephone numbers, addresses, times, dates, event names, and product names.

19. The system of claim 14, wherein the locations include email in a data file store and an address book.

20. The system of claim 14, wherein:
the first data set and the second data set are data types selected from the group consisting of: contact data; calendar entries; event names; product names; and scheduling data, and
the data integrity options include updating the newly identified trackable user-input data based on the first and second stored trackable user-input data; and
the system further comprises:
program instructions to send a request for confirmation to the user that the first data set and the second data set are the same or similar;
program instructions to receive confirmation from the user that the first data set and the second data set are the same or similar;
program instructions to receive a selection of one of the data integrity options; and
program instructions to automatically update, based on receiving the selection, the newly identified trackable user-input data based on the first and second stored trackable user-input data.

* * * * *